(12) United States Patent
Vermeer

(10) Patent No.: US 12,302,473 B2
(45) Date of Patent: May 13, 2025

(54) LOAD POWER CONTROL SYSTEM USING FAULT MANAGED POWER AND SINGLE PAIR ETHERNET

(71) Applicant: Panduit Corp., Tinley Park, IL (US)

(72) Inventor: Michael J. Vermeer, Cedar Lake, IN (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 18/533,444

(22) Filed: Dec. 8, 2023

(65) Prior Publication Data

US 2024/0130026 A1    Apr. 18, 2024

Related U.S. Application Data

(63) Continuation of application No. 17/542,591, filed on Dec. 6, 2021, now Pat. No. 11,889,607.

(60) Provisional application No. 63/131,960, filed on Dec. 30, 2020.

(51) Int. Cl.
  *H05B 47/185* (2020.01)
(52) U.S. Cl.
  CPC ................... *H05B 47/185* (2020.01)
(58) Field of Classification Search
  CPC ........ H05B 47/185; H05B 47/18; H04L 12/10
  See application file for complete search history.

(56) References Cited

U.S. PATENT DOCUMENTS

| | | | |
|---|---|---|---|
| 8,319,627 B2 | 11/2012 | Chan et al. | |
| 8,782,297 B2 | 7/2014 | Voss et al. | |
| 9,155,171 B1 | 10/2015 | Hughes et al. | |
| 9,374,870 B2 | 6/2016 | Cumpston et al. | |
| 9,893,521 B2 | 2/2018 | Lowe et al. | |
| 10,034,340 B2 | 7/2018 | Wang | |
| 10,256,995 B1 | 4/2019 | Matute | |
| 10,455,654 B1 | 10/2019 | Andrews et al. | |
| 10,468,889 B2 | 11/2019 | Andrews et al. | |
| 10,790,997 B2 | 9/2020 | Jones et al. | |
| 11,889,607 B2* | 1/2024 | Vermeer | H04B 3/54 |
| 2006/0007614 A1* | 1/2006 | Pozzuoli | H02M 3/335 |
| | | | 361/62 |
| 2010/0198535 A1 | 8/2010 | Brown et al. | |
| 2011/0001626 A1 | 1/2011 | Yip et al. | |
| 2011/0140611 A1 | 6/2011 | Elek et al. | |
| 2012/0043889 A1 | 2/2012 | Recker et al. | |
| 2013/0031378 A1 | 1/2013 | Schindler et al. | |
| 2013/0141007 A1 | 6/2013 | Wood et al. | |
| 2016/0374183 A1 | 12/2016 | Chen et al. | |
| 2018/0006492 A1 | 1/2018 | Kim et al. | |
| 2018/0054083 A1 | 2/2018 | Hick | |
| 2019/0081805 A1 | 3/2019 | Frezza et al. | |

(Continued)

FOREIGN PATENT DOCUMENTS

WO    2020198094 A1    10/2020

*Primary Examiner* — Minh D A

(74) *Attorney, Agent, or Firm* — Peter S. Lee; Christopher S. Clancy; James H. Williams

(57) ABSTRACT

An enhanced lighting control system is provided that utilizes updated communications technology to provide a cost and resource efficient lighting control system that allows for a retrofit installation into existing lighting systems. The lighting control system utilizes single pair ethernet connection protocols, as well as a pulsed power source, to enable the efficiencies.

20 Claims, 6 Drawing Sheets

(56) References Cited

U.S. PATENT DOCUMENTS

2020/0111409 A1      4/2020   Pahlevaninezhad et al.
2020/0163186 A1*     5/2020   Poojary ................. H02J 7/0068

* cited by examiner

LOAD POWER CONTROL SYSTEM USING FAULT MANAGED POWER AND SINGLE PAIR ETHERNET

CROSS-REFERENCE TO RELATED APPLICATION(S)

This application is a continuation of U.S. Non-Provisional patent application Ser. No. 17/542,591, filed on Dec. 6, 2021, which claims benefit to U.S. Provisional Patent Application No. 63/131,960, filed on Dec. 30, 2020, the entirety of all of which is hereby incorporated by reference herein.

BACKGROUND

Lighting control systems have been installed to provide control to one or more lighting devices coupled to the system. Lighting control systems may achieve control over various lighting control features, while also controlling the power supplied to the lighting devices.

However, even with the advantages that lighting control systems offer, adaptation of existing lighting control systems has been slow. One exemplary reason for the lack in widespread adaption is the high initial costs of installing existing lighting control systems in terms of monetary costs and use of resources. Therefore, the current disclosure describes a lighting control system that implements updated technology to make installation more cost and resource effective.

DETAILED DESCRIPTION

Figure 1:
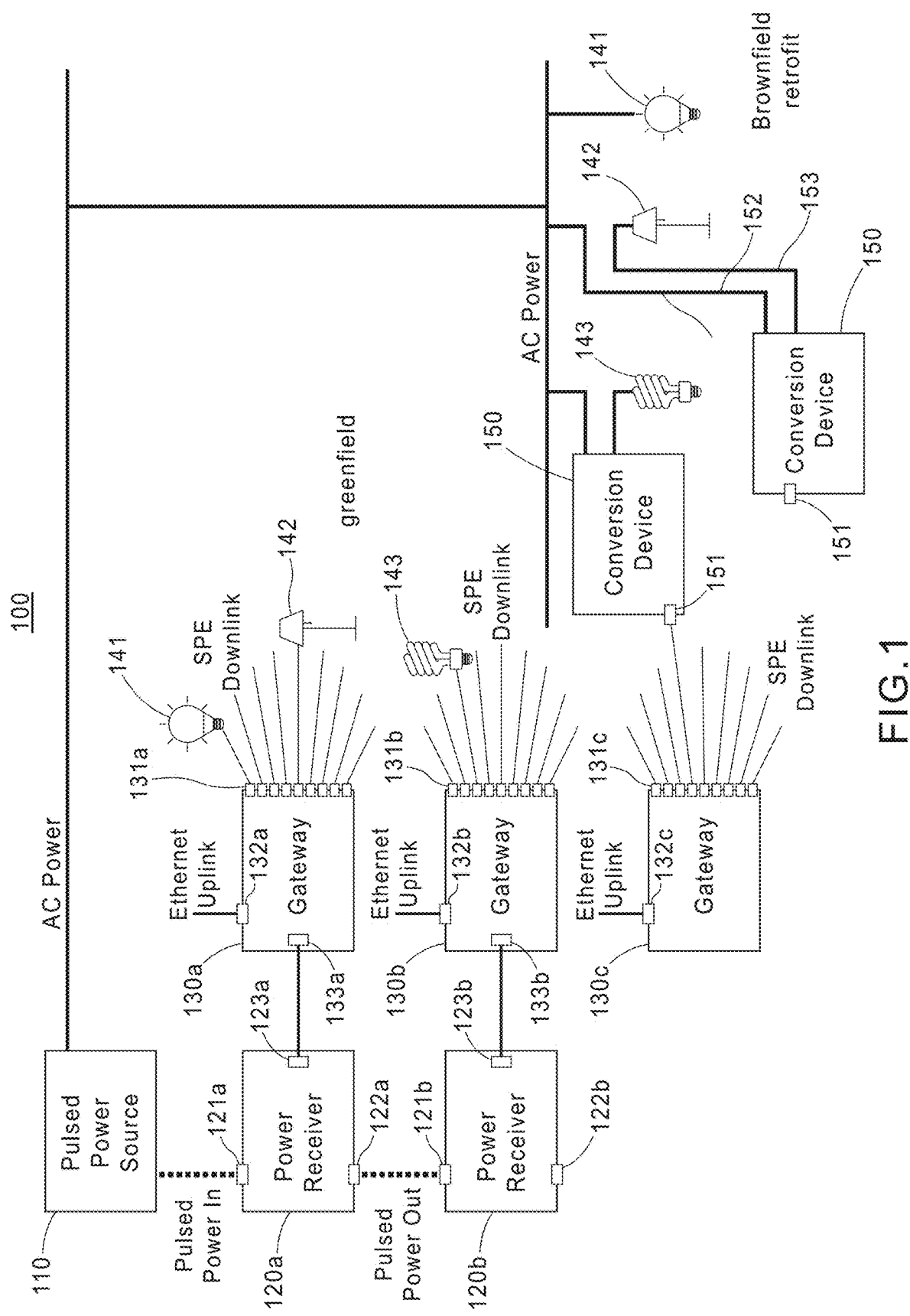
FIG. 1 illustrates an exemplary lighting control system, according to an embodiment.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Existing lighting control systems (e.g., Digital Addressable Lighting Interface (DALI)) may be configured to control and supply power to each light and lighting control device (e.g., actuator or sensor elements) in an environment. However, such existing lighting control systems (e.g., DALI systems) communicate to lighting devices using serial interfaces and protocols, requiring device addressing outside of the ethernet network and requiring complex programming in order to take advantage of the full benefits of available features. Such existing lighting control systems (e.g., DALI systems) also require separate infrastructure to provide power and controls to their lighting devices. Other existing lighting control systems use updated wireless protocols (e.g., Zigbee) to control their lighting devices. So, while these existing lighting control systems may offer some advanced technological features, they are also cumbersome and require devoted resources to management and upgrade. For example, these wireless control lighting systems require the replacement of existing lighting devices and/or lighting control elements with new components that are compatible with the wireless protocols, and also still require separate infrastructure to power their lighting devices, thus requiring a large initial capital investment to install. It follows that the existing lighting control systems are either incapable of being updated to provide intelligent control or pose an expensive/prohibitive barrier to implement due to the high costs of installing and configuring new equipment.

The current disclosure describes an enhanced lighting control system that utilizes updated communications technology to provide a cost and resource efficient lighting control system that allows for a retrofit installation into existing lighting systems. The retrofit installation is cost and resource efficient as it does not require installing new connectivity components and does not require extensive replacement of existing lighting infrastructure. For example, the lighting control system 100 illustrated in FIG. 1 utilizes the single pair ethernet (SPE) protocol that offers the advantages of a smaller footprint that can be installed into existing cabling environments, unlike the larger format cabling required by other power over wire protocols such as power over ethernet (PoE). SPE also offers the advantage of providing both a data line and a power line to enable both power and data communications to the end lighting devices using a single two-conductor (i.e., single pair) cable. The lighting control system 100 also utilizes a pulsed power type of power source 110, for providing safe power over longer distances over the SPE cables. It follows that the lighting control system 100 delivers intelligent lighting in a system that can be deployed more simply and scaled more cost effectively than, for example, existing lighting systems based on the PoE protocols. The lighting control system 100 also eliminates the need for separate infrastructure to provide power and control the lighting devices in the lighting control system 100, which would otherwise be needed for traditional lighting control systems existing in the market today (e.g., DALI systems). The lighting control system 100 may also be installed in retrofit applications with the use of a conversion device 150, as described in more detail herein.

The lighting control system 100 includes a power source 110, power receivers 120a-b, gateways 130a-c, conversion devices 150, and various different types of lighting devices 141-143 that are being powered and controlled by the lighting control system 100. The lighting devices 141-143 may include a first type of light bulb 141 (e.g., Light Emitting Diode (LED) light bulb), a lamp 142, and a second type of light bulb 143 (e.g., Compact Fluorescent Lamp (CFL) light bulb). Other types of lighting devices, such as an outdoor street lamp 144 illustrated in FIG. 5, may also be controlled by the lighting control system 100. The lighting control system 100 may control the one or more features relating to the lighting devices 141-144 such as times they are powered on/off, intensity of the light, color of the emitted light, and connecting them to one or more peripheral devices (e.g., actuators or sensors) involved in the lighting control solution. The lighting feature control function may be controlled by, for example, controlling the power being supplied to the lighting devices 141-144 or by transmitting a command signal to the lighting devices 141-144 for the lighting devices to directly control its own lighting feature when the lighting device includes intelligent control circuitry.

Figure 2:
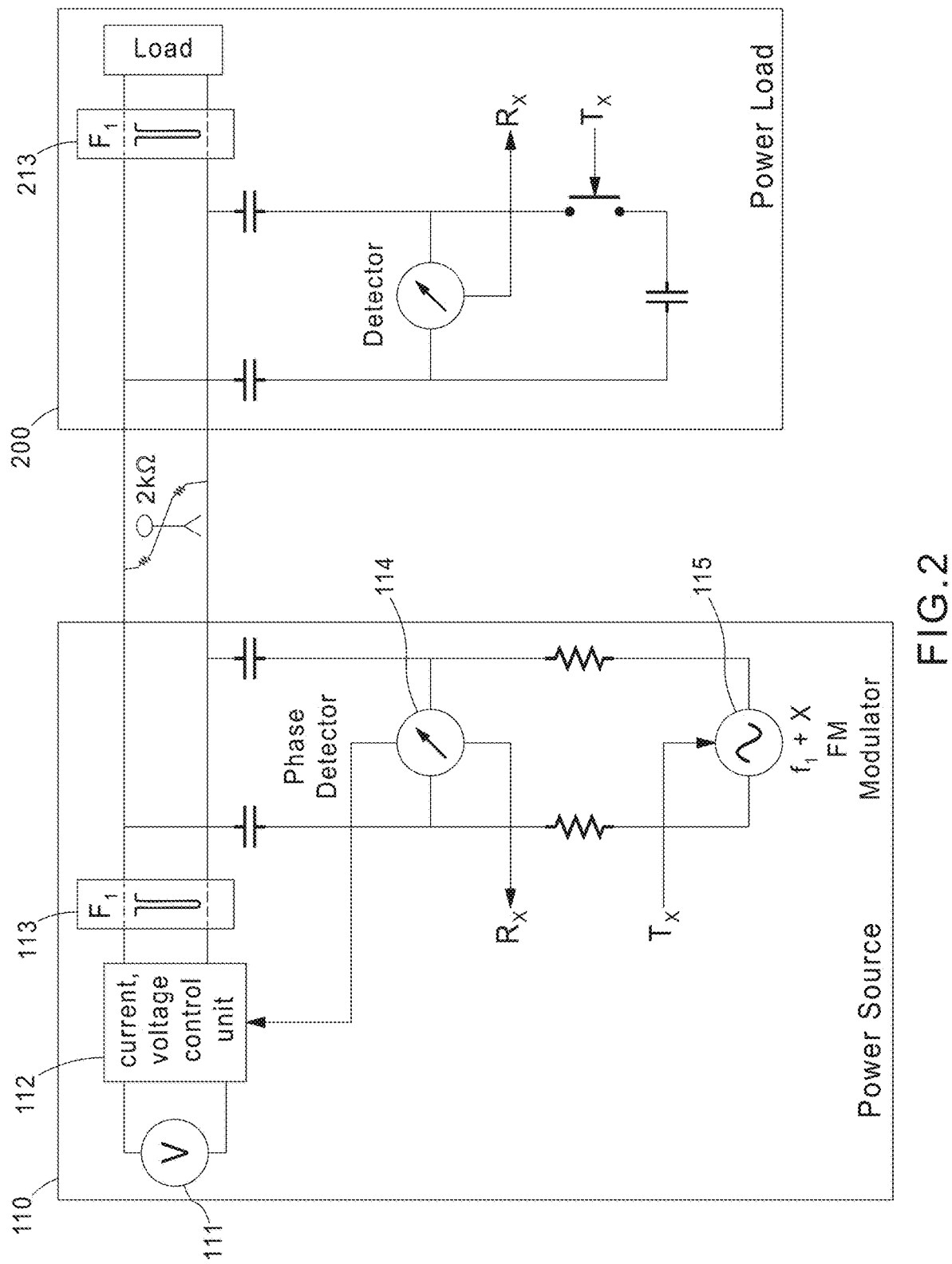
FIG. 2 illustrates an exemplary power source system that may be used to provide power to the lighting control system in FIG. 1, according to an embodiment.

The power source 110 illustrated in FIG. 1 is configured to convert one-phase or two-phase power and deliver pulsed power to the lighting control system 100, as described for example in U.S. patent application Ser. No. 17/512,081, filed Oct. 27, 2021, the entirety of which is hereby incorporated by reference herein. FIG. 2 illustrates an exemplary power distribution system that includes the power source 110 providing power to an exemplary power load 200, according to some embodiments. In the block diagram of FIG. 2, the power source 110 is shown to include a power source 111, a current/voltage control unit 112, a band reject filter 113, a phase detector circuitry 114, and a frequency modulation (FM) modulator circuitry 115.

The power source 111 may be representative of standard 120V/20 Amp AC power provided at a building environment, that may be connected to the power source 110. The current/voltage control unit 112 receives the standard 120V/20 Amp AC power and converts it to high voltage (e.g., ~360 V), low amperage current DC power. This DC power signal is then output to the power load 200 in controlled pulsed current waveforms. The pulsed power may be transmitted over standard multi-conductor cabling, such as the SPE cabling described herein.

The power load 200 illustrated in FIG. 2 may be representative of the power receivers 120*a-b* shown in FIG. 1, or other power receiving load devices. The power load 200 receives the pulsed power from the power source 110 and converts the pulse current waveform to ±48 Vdc to then power the end devices such as the lighting devices 141-144.

The band reject filter 113, the phase detector circuitry 114, and the frequency modulation (FM) modulator circuitry 115 are included as part of a fault management detection system of the power source 110. As shown in FIG. 2, the power load 200 also includes a band reject filter 213, where both the band reject filter 113 and band reject filter 213 operate at the frequency $F_1$. So, at the frequency $F_1$, the impedance as seen looking into the band reject filter 213 is very high and does not pass through to the power source 110 or the power load 200. If a fault occurs (e.g., via a person in contact with both wires connecting the power source 110 and power load 200), the phase change is detected by the phase detector circuitry 114 and the power being supplied by the power source 110 will be turned off for a predetermined period of time, or until a turn on signal is input.

Figure 3:
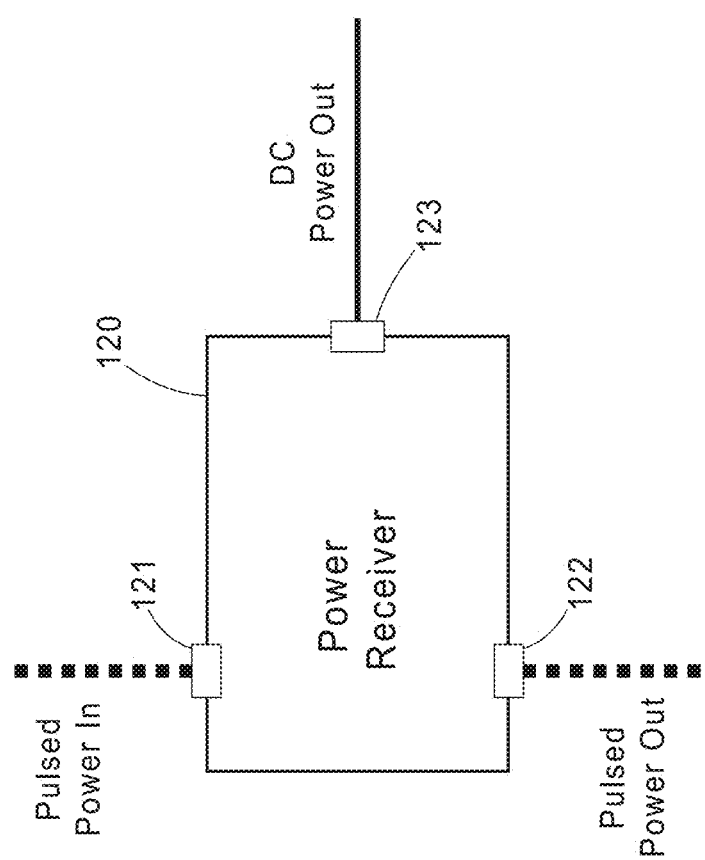
FIG. 3 illustrates an exemplary power receiver included in the lighting control system in FIG. 1, according to an embodiment.

FIG. 3 illustrates the power receiver 120 included in the lighting control system 100, according to an exemplary embodiment. The power receiver 120 includes a power receiving interface 121 configured to receive the power from the power source 110. The power receiver 120 includes power conversion circuitry for converting the received AC power into DC power, and further includes a first power transmission interface 123 that is configured to transmit the DC power to the gateway 130 in a pulsed waveform for application to the end load devices (e.g., lighting devices 141-144). The power receiver 120 also includes a second power transmission interface 122 for relaying out the pulsed power to another downstream power receiver 120. The second power transmission interface 122 allows for unused pulsed power received from the power source 110 to be transmitted further to downstream power receivers 120, thus allowing for the formation of a BUS power topology (e.g., for example as shown by the first power receiver 120*a* passing power to the downstream second power receiver 120*b* in the lighting control system 100).

Figure 4:
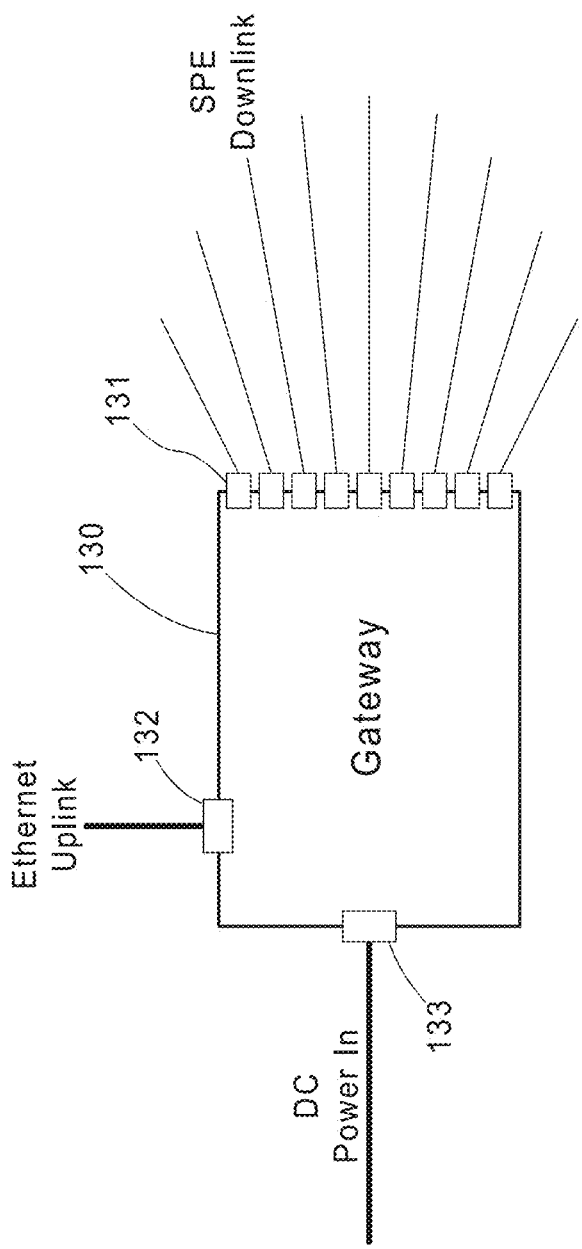
FIG. 4 illustrates an exemplary gateway included in the lighting control system in FIG. 1, according to an embodiment.
Figure 5:
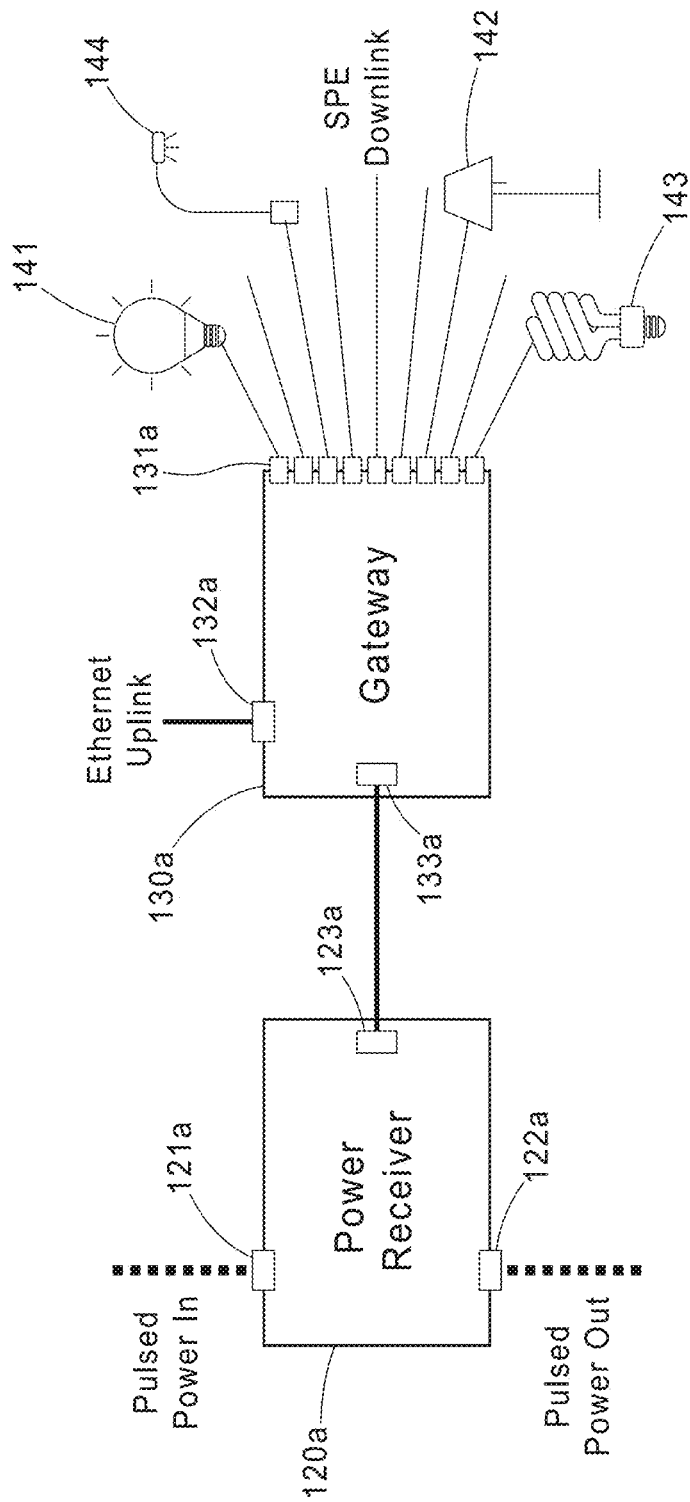
FIG. 5 illustrates an integrated sub-system device comprising the power receiver and gateway shown in FIG. 3 and FIG. 4, respectively, according to an embodiment.

FIG. 4 illustrates the gateway 130 included in the lighting control system 100, according to an exemplary embodiment. The gateway 130 is coupled to the power receiver 120, either integrally (e.g., as shown in FIG. 5) or as separate devices coupled through a direct DC power connection. The gateway 130 may include hardware, software, and/or circuitry for functioning as an intelligent controller which actively communicates and controls each lighting device 141-144 that are connected via the SPE downlink connections 131, while also delivering power to the lighting devices 141-144 coupled to the gateway 130. The gateway 130 may also include hardware, software, and/or circuitry for functioning as an intelligent switch that delivers power (e.g., SPE or Power over Ethernet (PoE)) plus Ethernet connectivity (Single, 2-pair, or 4-pair) to an Ethernet enabled lighting device connected via the SPE downlink connections 131. The gateway 130 receives power from the power receiver 120 via a power receiving interface 133 or may be packaged together to be integrally a part of the power receiver 120 as shown in FIG. 5. The intelligent commands may be received from a computing device via an Ethernet uplink interface 132.

Figure 6:
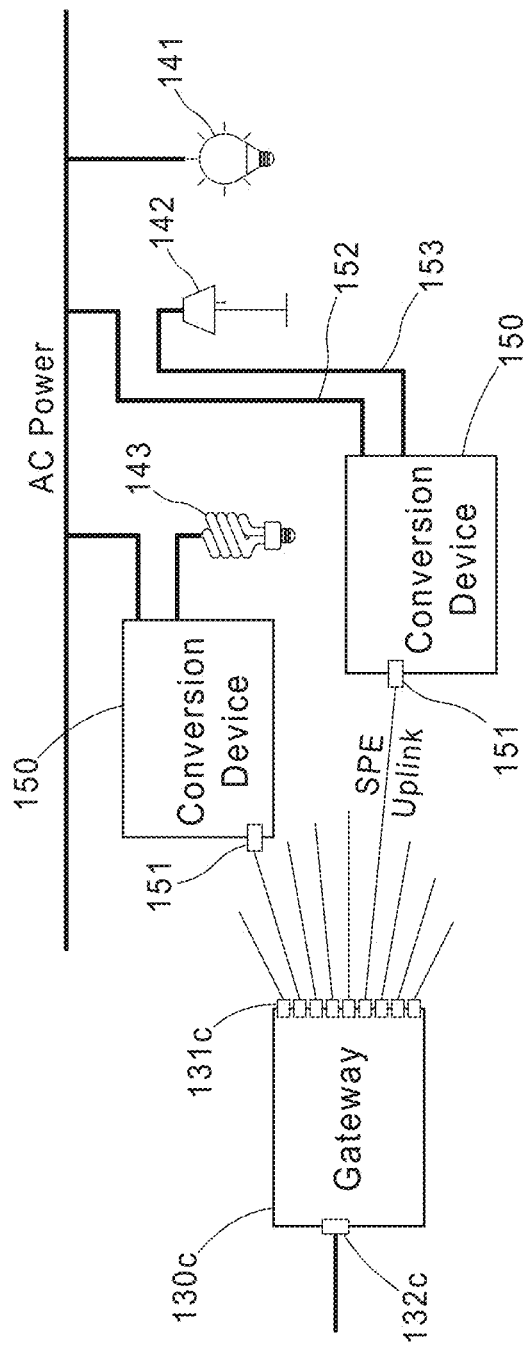
FIG. 6 illustrates an exemplary gateway communicating with a conversion device for a retrofit application shown in the lighting control system in FIG. 1, according to an embodiment.

The power receiver 120*a* and gateway 130*a* combination shown in FIG. 5 are an exemplary embodiment of a greenfield type of new install that is included in the lighting control system 100 using the pulsed power and SPE described herein. FIG. 6 shows a portion of the lighting control system 100 representing a brownfield type of retrofitting installation. In the retrofitting instance, the conversion device 150 functions as an edge gateway connected to the gateway 130*c* via the SPE uplink for receiving command communications via its communication interface 151. The conversion device 150 is further coupled to a power source via its power receiving interface 152 for receiving power that will be supplied to a lighting device 141-143 connected to the conversion device 150 via its lighting control interface 153. By utilizing the conversion device 150, this enables the conversion of existing A/C lighting infrastructures to be retrofitted with the SPE and/or pulse power components of the lighting control system 100 to make it an intelligent lighting infrastructure, thus allowing for intelligent lighting control, without requiring light fixture replacement or expensive infrastructure upgrades. For example, according to some embodiments the conversion device 150 may be supplied power from the existing AC power source in a building without necessarily installing the new pulsed power source 110, while according to other embodiments the pulsed power source 110 may be installed and used to supply power, or some combination of utilizing the different power sources may be implemented according to the lighting control system 100 to enable flexibility for different installation requirements. The use of SPE also allows for easier retrofit installations due to the smaller form of the single conductor pair cable, as opposed to other powered cable protocols (e.g., PoE) that require more than a single pair of conductors.

The methods, devices, processing, circuitry, and logic described above may be implemented in different ways and in different combinations of hardware and software. For example, all or parts of the device implementations may be circuitry including an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

What is claimed is:

1. A power receiver device, comprising:
   a power receiving interface configured to receive power from a power source, the received power being in a first power format that is a fault managed high voltage power with a voltage greater than 300 V, wherein the fault managed high voltage power is configured to cease power transmission when a fault is detected on a transmission wire carrying the fault managed high voltage power;
   a power conversion circuitry configured to convert the received power from the first power format to a second power format, the second power format being a lower voltage power with a voltage of 100 V or less; and
   a converted power transmitting interface configured to transmit the converted power in the second power format to a load device configured to be powered by the converted power in the second power format to a gateway device.

2. The power receiver device of claim 1, further comprising:
   a gateway device, the gateway device including an Ethernet uplink interface for communicating with an external computing device.

3. The power receiver device of claim 2, wherein the gateway device is configured to:
   receive lighting control commands from the external computing device via the Ethernet uplink interface.

4. The power receiver device of claim 3, wherein the gateway device is further configured to:
   control a lighting device by implementing at least one of a light on function, a light off function, or a light dimming function corresponding to the lighting control commands.

5. The power receiver device of claim 2, wherein the gateway device includes a single pair ethernet (SPE) downlink for communicating with a lighting device and providing power in the second power format to the lighting device.

6. The power receiver device of claim 1, wherein the power received from the power source is a pulsed power.

7. The power receiver device of claim 1, further comprising:
   a power transmitting interface configured to transmit at least a portion of the received power to an external power receiver in the first power format.

8. The power receiver device of claim 1, wherein the load device is a gateway device including an Ethernet uplink interface for communicating with an external computing device, wherein the gateway device is configured to receive a lighting control command from the external computing device via the Ethernet uplink interface;
   wherein the gateway device includes a SPE downlink for communicating the lighting control command to a conversion device; and
   wherein the conversion device controls a lighting device according to the lighting control command.

9. The power receiver device of claim 8, wherein the conversion device is configured to receive AC power.

10. A conversion device configured for a retrofit installation into an existing lighting infrastructure, the conversion device comprising:
    a power receiving interface configured to receive power in a first power format from a power source, wherein the first power format is a fault managed high voltage power with a voltage greater than 300 V, wherein the fault managed high voltage power is configured to cease power transmission when a fault is detected on a transmission wire carrying the fault managed high voltage power;
    a power conversion circuitry configured to convert the received power from the first power format to a second power format, wherein the second power format is a low voltage power with a voltage of 100 V or less;
    a communication interface configured to communicate with a gateway device to receive a lighting control command from the gateway device; and
    a lighting control interface configured to communicate with a lighting device to control a lighting feature of the lighting device according to the lighting control command.

11. The conversion device of claim 10, wherein the power receiving interface is further configured to receive power in a third power format, wherein the third power format is an AC power.

12. The conversion device of claim 10, wherein the lighting control command is at least one of a light on command, a light off command, or a light dimming command.

13. The conversion device of claim 10, wherein the lighting control command corresponds to a command for controlling at least one of a light on lighting feature, a light off lighting feature, or a light dimming lighting feature.

14. The conversion device of claim 10, wherein the communication interface receives the lighting control command via a single pair ethernet (SPE) connection.

15. The conversion device of claim 10, wherein the gateway device receives the lighting control command from an external computing device via an Ethernet uplink interface.

16. A power receiver device, comprising:
    a non-transitory machine-readable medium configured to store instructions; and
    a processor configured to execute the instructions stored on the non-transitory machine-readable medium to:

control a power receiving interface to receive power from a power source, the received power being in a first power format that is a fault managed high voltage power with a voltage greater than 300 V, wherein the fault managed high voltage power is configured to cease power transmission when a fault is detected on a transmission wire carrying the fault managed high voltage power;

control a power conversion circuitry to convert the received power from the first power format to a second power format, the second power format being a lower voltage power with a voltage of 100 V or less; and control a converted power transmitting interface to transmit the converted power in the second power format to a load device configured to be powered by the converted power in the second power format to a gateway device.

17. The power receiver device of claim 16, wherein the processor is further configured to execute the instructions stored on the non-transitory machine-readable medium to:

receive, via an Ethernet uplink interface of a gateway device, lighting control commands from an external computing device, and the gateway device is configured to control a lighting device according to the lighting control commands.

18. The power receiver device of claim 17, wherein the processor is further configured to execute the instructions stored on the non-transitory machine-readable medium to:

control, via a single pair ethernet (SPE) downlink, a lighting device by implementing at least one of a light on function, a light off function, or a light dimming function corresponding to the lighting control commands.

19. The power receiver device of claim 16, wherein the processor is further configured to execute the instructions stored on the non-transitory machine-readable medium to:

transmit, via a single pair ethernet (SPE) downlink, the converted power in the second power format to a lighting device.

20. The power receiver device of claim 16, wherein the converted power transmitting interface is configured to transmit the converted power in the second power format via a single pair ethernet (SPE) downlink.

* * * * *